(12) United States Patent
Gutt et al.

(10) Patent No.: US 8,635,350 B2
(45) Date of Patent: Jan. 21, 2014

(54) IP DEVICE DISCOVERY SYSTEMS AND METHODS

(75) Inventors: Gerald Gutt, Tucson, AZ (US); Aaron Wood, Boulder Creek, CA (US)

(73) Assignee: iControl Networks, Inc., Redwood City, CA (US)

( * ) Notice: Subject to any disclaimer, the term of this patent is extended or adjusted under 35 U.S.C. 154(b) by 1114 days.

(21) Appl. No.: 11/761,745

(22) Filed: Jun. 12, 2007

(65) Prior Publication Data

US 2007/0286210 A1    Dec. 13, 2007

Related U.S. Application Data

(60) Provisional application No. 60/804,550, filed on Jun. 12, 2006.

(51) Int. Cl.
*G06F 15/16* (2006.01)
*H04L 12/28* (2006.01)

(52) U.S. Cl.
USPC .......................... 709/229; 709/232; 370/401

(58) Field of Classification Search
USPC .................................. 370/401; 709/229, 232
See application file for complete search history.

(56) References Cited

U.S. PATENT DOCUMENTS

| | | | |
|---|---|---|---|
| 5,519,878 A | 5/1996 | Dolin, Jr. | |
| D416,910 S | 11/1999 | Vasquez | |
| 5,991,795 A | 11/1999 | Howard et al. | |
| 6,198,479 B1 | 3/2001 | Humpleman | |
| 6,219,677 B1 | 4/2001 | Howard | |
| 6,288,716 B1 | 9/2001 | Humpleman et al. | |
| D451,529 S | 12/2001 | Vasquez | |
| 6,331,122 B1 | 12/2001 | Wu | |
| 6,363,417 B1 | 3/2002 | Howard et al. | |
| 6,370,436 B1 | 4/2002 | Howard et al. | |
| 6,377,861 B1 | 4/2002 | York | |
| 6,400,265 B1 | 6/2002 | Saylor et al. | |
| D464,328 S | 10/2002 | Vasquez et al. | |
| D464,948 S | 10/2002 | Vasquez et al. | |
| 6,462,663 B1 | 10/2002 | Wilson et al. | |
| 6,467,084 B1 | 10/2002 | Howard et al. | |
| 6,493,020 B1 | 12/2002 | Stevenson et al. | |
| 6,496,927 B1 | 12/2002 | McGrane et al. | |

(Continued)

FOREIGN PATENT DOCUMENTS

| JP | 2003-85258 A | 9/2001 |
|---|---|---|
| JP | 2003-141659 | 10/2001 |

(Continued)

OTHER PUBLICATIONS

Alarm.com—Interactive Security Systems, Product Advantages, printed from website Nov. 4, 2003, 3 pp.

(Continued)

*Primary Examiner* — Faruk Hamza
*Assistant Examiner* — Andrew Oh
(74) *Attorney, Agent, or Firm* — Gregory & Sawrie LLP (57) ABSTRACT

A method for Internet Protocol (IP) device discovery implemented in a control network having a gateway device, a router, and an IP device at a location. A location management system including a IP device at a location having an IP address assigned by a router at the location. A gateway device for managing a set of two or more local management devices at a location.

29 Claims, 3 Drawing Sheets

(56) References Cited

U.S. PATENT DOCUMENTS

| | | | |
|---|---|---|---|
| 6,529,723 | B1 | 3/2003 | Bentley |
| 6,542,075 | B2 | 4/2003 | Barker et al. |
| 6,574,234 | B1 | 6/2003 | Myer et al. |
| 6,580,950 | B1 | 6/2003 | Johnson et al. |
| 6,587,455 | B1* | 7/2003 | Ray et al. ............ 370/352 |
| 6,587,736 | B2 | 7/2003 | Howard et al. |
| 6,591,094 | B1 | 7/2003 | Bentley |
| 6,597,703 | B1* | 7/2003 | Li et al. ............ 370/428 |
| 6,601,086 | B1 | 7/2003 | Howard et al. |
| 6,609,127 | B1 | 8/2003 | Lee et al. |
| 6,615,088 | B1 | 9/2003 | Myer et al. |
| 6,631,416 | B2 | 10/2003 | Bendinelli |
| 6,648,682 | B1 | 11/2003 | Wu |
| 6,661,340 | B1 | 12/2003 | Saylor et al. |
| 6,721,689 | B2 | 4/2004 | Markle et al. |
| 6,959,341 | B1* | 10/2005 | Leung ............ 709/250 |
| 6,965,313 | B1 | 11/2005 | Saylor et al. |
| 7,015,806 | B2 | 3/2006 | Naidoo et al. |
| 7,034,681 | B2 | 4/2006 | Yamamoto et al. |
| 7,113,090 | B1 | 9/2006 | Saylor et al. |
| 7,313,102 | B2* | 12/2007 | Stephenson et al. ......... 370/254 |
| 7,349,761 | B1 | 3/2008 | Cruse |
| 7,430,614 | B2* | 9/2008 | Shen et al. ............ 709/245 |
| 7,634,519 | B2 | 12/2009 | Creamer et al. |
| 2002/0083342 | A1 | 6/2002 | Webb et al. |
| 2002/0103927 | A1 | 8/2002 | Parent |
| 2002/0107910 | A1 | 8/2002 | Zhao |
| 2002/0111698 | A1 | 8/2002 | Graziano et al. |
| 2002/0133578 | A1* | 9/2002 | Wu ............ 709/222 |
| 2002/0143923 | A1 | 10/2002 | Alexander |
| 2002/0180579 | A1 | 12/2002 | Nagoka et al. |
| 2002/0184301 | A1 | 12/2002 | Parent |
| 2003/0051009 | A1 | 3/2003 | Shah et al. |
| 2003/0065757 | A1* | 4/2003 | Mentze et al. ............ 709/222 |
| 2003/0115345 | A1* | 6/2003 | Chien et al. ............ 709/229 |
| 2003/0132018 | A1 | 7/2003 | Okita et al. |
| 2003/0174648 | A1 | 9/2003 | Wang et al. |
| 2003/0177236 | A1* | 9/2003 | Goto et al. ............ 709/225 |
| 2003/0187920 | A1 | 10/2003 | Redkar |
| 2003/0217136 | A1 | 11/2003 | Cho et al. |
| 2003/0236841 | A1 | 12/2003 | Epshteyn |
| 2005/0038326 | A1 | 2/2005 | Mathur |
| 2005/0079855 | A1 | 4/2005 | Jethi et al. |
| 2005/0197847 | A1 | 9/2005 | Smith |
| 2005/0216302 | A1 | 9/2005 | Raji et al. |
| 2005/0216580 | A1 | 9/2005 | Raji et al. |
| 2005/0249199 | A1* | 11/2005 | Albert et al. ............ 370/352 |
| 2006/0045074 | A1* | 3/2006 | Lee ............ 370/352 |
| 2006/0181406 | A1 | 8/2006 | Petite et al. |
| 2007/0002833 | A1* | 1/2007 | Bajic ............ 370/352 |
| 2007/0052675 | A1* | 3/2007 | Chang ............ 345/158 |
| 2007/0106124 | A1 | 5/2007 | Kuriyama et al. |
| 2007/0230415 | A1* | 10/2007 | Malik ............ 370/338 |
| 2007/0286369 | A1 | 12/2007 | Gutt et al. |
| 2008/0147834 | A1 | 6/2008 | Quinn et al. |
| 2008/0180240 | A1 | 7/2008 | Raji et al. |
| 2008/0183842 | A1 | 7/2008 | Raji et al. |
| 2008/0235326 | A1 | 9/2008 | Parsi et al. |
| 2009/0019141 | A1* | 1/2009 | Bush et al. ............ 709/223 |
| 2009/0049488 | A1* | 2/2009 | Stransky ............ 725/93 |
| 2009/0204693 | A1 | 8/2009 | Andreev et al. |
| 2009/0240787 | A1 | 9/2009 | Denny |
| 2010/0082744 | A1 | 4/2010 | Gutt |
| 2010/0095111 | A1 | 4/2010 | Gutt |
| 2010/0095369 | A1 | 4/2010 | Gutt |

FOREIGN PATENT DOCUMENTS

| | | |
|---|---|---|
| JP | 02-055895 | 2/2002 |
| JP | 2004-192659 | 2/2004 |
| JP | H08-227491 | 9/2008 |
| KR | 2006-0021605 | 9/2004 |
| WO | WO-01-52478 | 7/2001 |
| WO | WO-01-99078 | 12/2001 |
| WO | WO-02-21300 A1 | 3/2002 |
| WO | WO-2004-004222 | 1/2004 |
| WO | WO-2004-107710 | 12/2004 |
| WO | WO 2005/091218 A2 | 9/2005 |
| WO | WO 2005/091218 A3 | 9/2005 |

OTHER PUBLICATIONS

Alarm.com—Interactive Security Systems, Frequently Asked Questions, printed from website Nov. 4, 2003, 3 pp.
Alarm.com—Interactive Security Systems, Elders, printed from website Nov. 4, 2003, 1 page.
Alarm.com—Interactive Security Systems, Overview, printed from website Nov. 4, 2003, 2 pp.
X10—ActiveHome, Home Automation Made Easy!, printed from website Nov. 4, 2003, 3 pp.
Examination Report under Section 18(3) re UK patent application No. GB0724760.4 dated Jan. 30, 2008.
Examination Report under Section 18(3) re UK patent application No. GB0724248.0 dated Jan. 30, 2008.
Examination Report under Section 18(3) re UK patent application No. GB0724248.0 dated Jun. 4, 2008.
Examination Report under Section 18(3) re UK patent application No. GB0800040.8 dated Jan. 30, 2008.
Examination Report under Section 18(3), dated Aug. 13, 2007 re UK patent application No. GB0620362.4.
U.S. Appl. No. 12/630,092 Office Action mailed Jul. 21, 2010.
U.S. Appl. No. 12/019,568 Office Action mailed Jul. 13, 2010.
U.S. Appl. No. 12/019,554 Office Action mailed Jul. 12, 2010.
U.S. Appl. No. 12/019,554 Office Action mailed Jan. 5, 2010.
U.S. Appl. No. 11/084,232 Office Action mailed Sep. 14, 2010.
EP 05725743.8 Supplemental Search Report mailed Sep. 14, 2010.

* cited by examiner

FIG. 4 ns and Methods

CROSS-REFERENCE

This application claims the benefit of U.S. Provisional Application No. 60/804,550, filed Jun. 12, 2006, which application is incorporated herein by reference.

BACKGROUND

Vendors such as premises vendors, communication service vendors, and Internet portal vendors may desire to extend their relationship with vendees beyond the immediate transaction. Additionally, vendees desire additional premises management services beyond the immediate transaction for premises, communication services, or Internet portals. There is a need for advanced premises management services, methods, devices, and systems.

INCORPORATION BY REFERENCE

All publications and patent applications mentioned in this specification are herein incorporated by reference to the same extent as if each individual publication or patent application was specifically and individually indicated to be incorporated by reference. The following application incorporates by reference application Ser. No. 11/084,232, filed on Mar. 16, 2005 and application Ser. No. 11/084,657 filed on Mar. 16, 2005, in their entirety.

DETAILED DESCRIPTION

While preferred embodiments of the present invention have been shown and described herein, such embodiments are provided by way of example only. Various alternatives to the embodiments of the invention described herein may be employed in practicing the invention.

Figure 1:
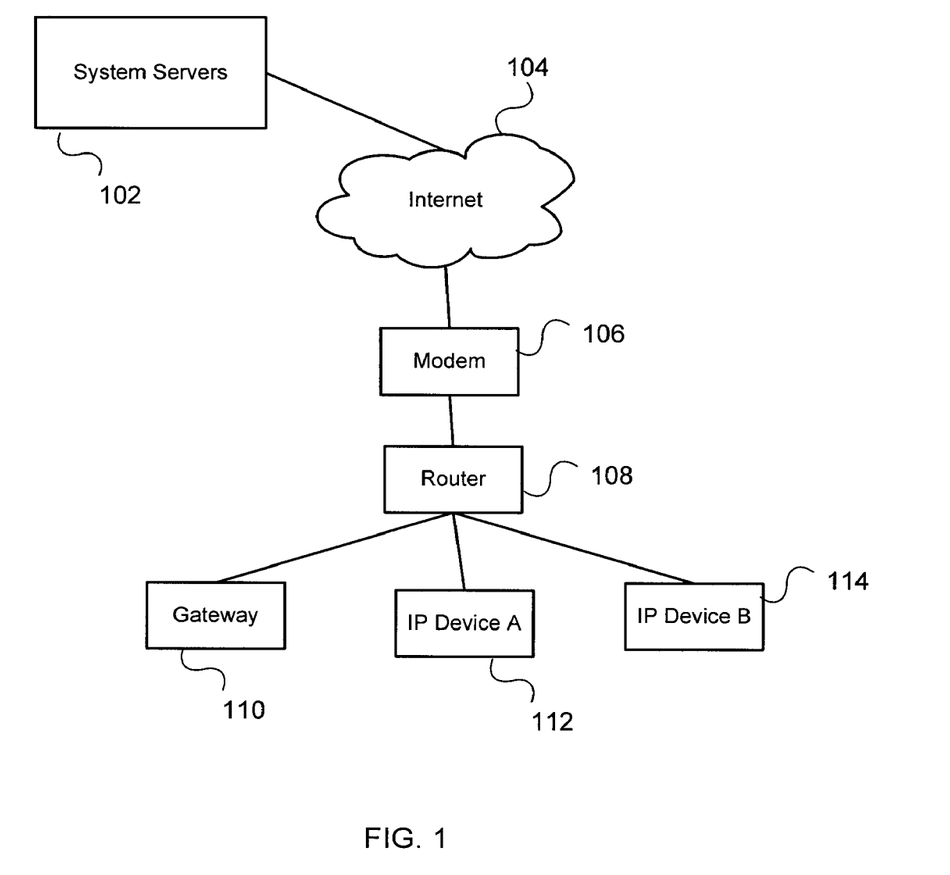
FIG. 1 is a block diagram of a control network, according to an embodiment.

The system makes use of local management devices, which can include, for example, IP (Internet Protocol) devices. These devices are out on a local network at a location, such as a premises, which can include, as non-limiting examples, a home or a business premises. A system gateway device communicates to the devices at the location as well as talking to the system servers. For example, FIG. 1 is a block diagram of a control network, according to an embodiment. FIG. 1 depicts an embodiment of a system showing IP devices 112, 114 at a location coupled to router 108, gateway device 110 (Gateway) coupled to IP devices 112, 114 through router 108 and coupled to at least one server 102 through router 108 and Internet 104, wherein server 102 is at a location remote to the location of gateway 110 and IP devices 112, 114. Router 108, in the embodiment shown in FIG. 1 is coupled through modem 106 and through Internet 104 to at least one gateway server, in this embodiment, system servers 102.

In order to communicate with IP devices 112, 114 on the local control network, gateway 110 locates those devices' IP addresses. Gateway 110 may earlier obtain the Ethernet address (a unique, hard coded address of the device, also called a MAC Id) of each device it is to communicate with, but it will use a higher-level protocol to properly communicate with the device.

Different mechanisms may be used to locate devices on a network, including, for example, Domain Name System (DNS), Universal Plug and Play (UPnP), Bonjour, and/or others. These mechanisms may not be supported by all devices. For example, many consumer home networks do not have a DNS server for name registration, and the devices that are communicated with may not support UPnP or Bonjour (or similar protocol) due to lack of sufficient resources (e.g., limited processor speed or memory capacity).

The system or device which controls and manages local management devices on a local control network may know the hardware Ethernet address (also called the MAC id) of all the devices on the network. But it may not know which IP address to use to communicate with a particular device.

However, an Address Resolution Protocol (ARP) can be used to determine which IP address is used by a given device on the same network. When two devices are to communicate over IP, but do not know the Ethernet address that the other is at, ARP can be used to send out a broadcast message asking which Ethernet address is using the IP address of the other device. For example:

ARP Request: "Who is 192.168.0.1?"
ARP Response: "192.168.0.1 is at 00:11:22:33:44:55"

The system or device broadcasting the message then knows that to talk to IP address 192.168.0.1, it can send IP packets to the Ethernet device 00:11:22:33:44:55.

Brute force tools such as nmap, a network mapper, work by sending an ARP exchange to every possible IP address in the address space for a network (IP networks are broken up into subnets, which are continuous ranges of IP addresses). Brute force algorithms are very network bandwidth and device processing power intensive. A typical network address space for a home (residential) network is 256 addresses. In order to find all the IP devices on the network, 256 requests are sent out, one to each address on the network, and the results all correlated:

"Who is 192.168.0.1?"
"Who is 192.168.0.2?"
"Who is 192.168.0.3?"
"Who is 192.168.0.4?"
"Who is 192.168.0.5?"...
"Who is 192.168.0.231?"
"192.168.0.231 is at 00:11:22:33:44:55"
"Who is 192.168.0.232?"...
"Who is 192.168.0.255?"

Figure 2:
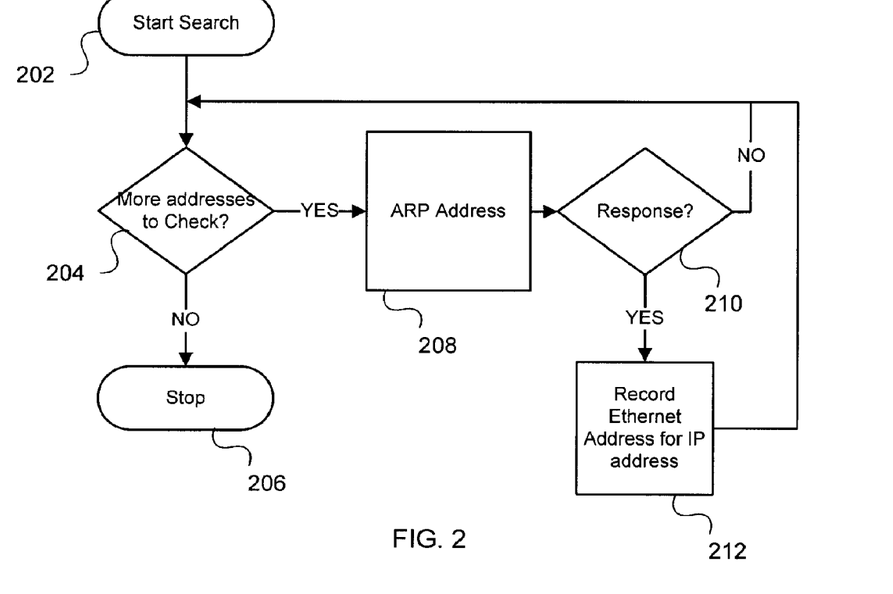
FIG. 2 is a block diagram of a method of determining IP addresses using Address Resolution Protocol (ARP).

For example, FIG. 2 is a block diagram of a method of determining IP addresses using Address Resolution Protocol (ARP). FIG. 2 depicts a brute force method of determining the IP addresses for all IP devices on a user's network using Address Resolution Protocol (ARP) and checking all IP addresses within the subnet of addresses of the user's network. In such a method, the search for all IP addresses assigned to IP devices is begun (step 202). The gateway device performing the algorithm queries whether there are more addresses to check (step 204). If there are, it sends a request (ARP Address), such as "Who is 192.168.0.231?" (step 208). If there is a response (block 210), the device records the response (step 212). The response typically includes the IP address and the Ethernet address of the device for which the IP address has been assigned, for example "192.168.0.231 is at 00:11:22:33:44:55". If there is no response, the device performing the algorithm queries whether there are more addresses to check (step 204), and continues through the algorithm again and repeats the method until there are no more addresses to check, at which time the search stops (step 206).

The size of the address space for a given network varies from network to network. While 256 addresses is very common, there are also networks with much larger address spaces (65356 addresses is also common). A very small network may be inspected in a reasonable amount of time by a constraint resource device such as the system gateway; however, a network of even a common size such as 256 addresses may not.

Devices, systems, and methods are needed to reduce the time and/or resources used to find the IP addresses for all IP devices on a network without initially searching the entire address space for a given network.

Provided herein is a gateway device that uses a method by which it searches a much smaller space of addresses than the entire subnet for the IP addresses of additional IP devices, while remaining relatively certain that it has searched the range of addresses which includes the IP addresses of the additional IP devices.

As a non-limiting example, a network for premises management is typically managed by a router device (router). This router performs several functions. One function is to assign IP addresses to all devices on the network. The protocol used for this is Dynamic Host Configuration Protocol (DHCP).

This router chooses the range of addresses to use for the network (the subnet size). It also assigns all devices on the network to a range of addresses within that subnet that it manages (pool). Thus, a much smaller, continuous range of addresses, i.e. the pool, is used as the source of addresses from which to assign an IP address to Ethernet devices on the network.

Figure 3:
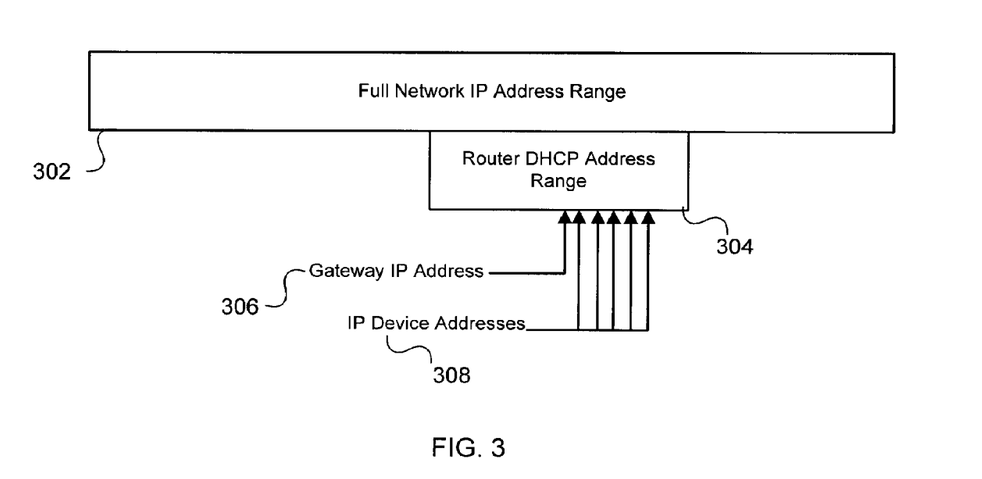
FIG. 3 is a block diagram of a subnet of IP address and a pool of router IP addresses, according to an embodiment.

The router usually starts at one end of the pool, and assigns a first address to a device, then assigns subsequent addresses sequentially (i.e. linearly or progressively) through the range. This results in all the assigned addresses being adjacent to each other. FIG. 3 is a block diagram of a subnet of IP addresses 302 and a pool 304 of router IP addresses, according to an embodiment. FIG. 3 depicts the full network IP address range 302 (subnet) and the router DHCP address range 304 (the pool) which is smaller than the subnet 302 and which the router uses to assign all IP addresses for IP devices connected to the router, including the gateway device's IP address 306, and other IP devices' addresses 308.

Using ARP, and the assumption that the router assigns IP addresses sequentially from a pool of IP addresses wherein the pool is smaller than the subnet of IP addresses available on the network, the gateway device (also called the system gateway and/or called gateway) can choose a much smaller block of addresses (the subset) out of the larger address space (subnet) from which to search. As the gateway device receives its address from the server, it can assume the other devices have addresses adjacent to it.

Figure 4:
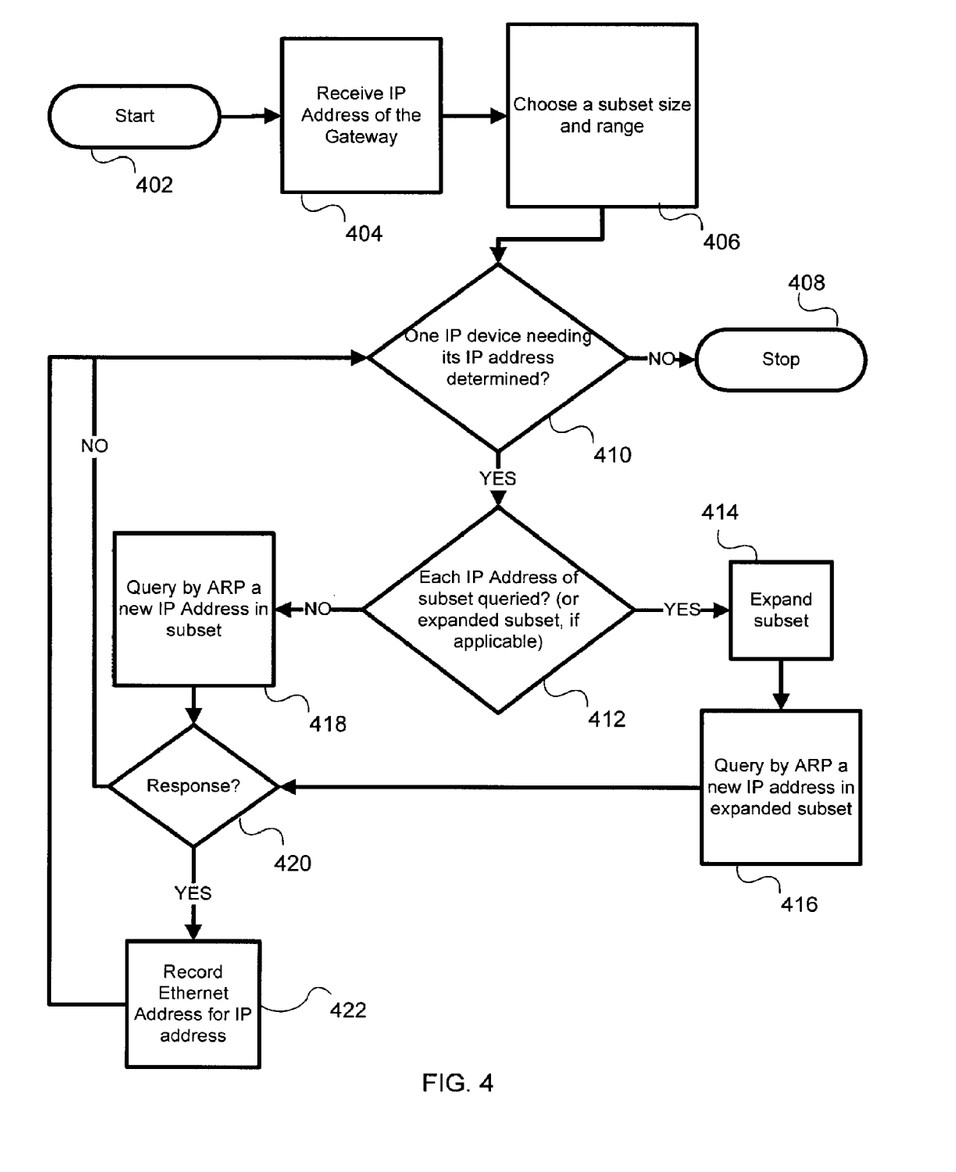
FIG. 4 is a block diagram of a method for IP device discovery, according to an embodiment.

FIG. 4 is a block diagram of a method for IP device discovery, according to an embodiment. As depicted in FIG. 4, when the search is started (depicted by "Start" 402), the IP address of the gateway is received by the gateway (depicted by process "Receive IP Address of the Gateway" 404), and the gateway then chooses subset of the subnet (depicted by process "Choose a subset size and range" 406) which includes the IP address of the gateway. The subset range chosen is based on the IP address of the gateway device (gateway) and the size, in some embodiments, can be based on the total number of IP devices on the local network.

In some embodiments, the subset is substantially smaller than the subnet. For example, in some embodiments, the size of the subset may be 10 sequential IP addresses in the range, 25 sequential IP addresses in the range, 50 sequential IP addresses in the range, 100 sequential IP addresses in the range, 150 sequential IP addresses in the range, 200 sequential IP addresses in the range, and/or between 10 and 200 sequential IP addresses in the range. In other embodiments the size of the subset may be some fraction of the subnet, such as at most about $\frac{1}{10}$ of the subnet size, at most about $\frac{1}{8}$ of the subnet size, at most about $\frac{1}{6}$ of the subnet size, at most about $\frac{1}{4}$ of the subnet size, at most about $\frac{1}{3}$ of the subnet size, at most about $\frac{1}{2}$ of the subnet size, and/or at most about $\frac{3}{5}$ of the subnet size. In some embodiments, the subset comprises at least one of: at most about 25% of the number of IP addresses in the router pool, at most about 50% of the number of IP addresses in the router pool, at most about 75% of the number of IP addresses in the router pool, at most about 100% of the number of IP addresses in the router pool, at most about 125% of the number of IP addresses in the router pool, at most about 150% of the number of IP addresses in the router pool, at most about 200% of the number of IP addresses in the router pool, at most about 250% of the number of IP addresses in the router pool, and at most about 300% of the number of IP addresses in the router pool. The term "about" when referring to subnet size, pool size, subset size, or IP addresses, refers to variations of 1 to 3 addresses, or 2 to 5 addresses.

Further depicted in FIG. 4 is the step, after choosing the subset, of querying each IP address of the subset (depicted by decision "One IP device needing its IP address determined?" 410 and decision "Each IP Address of subset queried?" 412) using an ARP (depicted by process "Query by ARP a new IP address in subset" 418), as described herein for each IP address of the subset. The gateway device may query more IP addresses if there is at least one IP device needing its IP address determined (there may be more than one). If any response (depicted by decision "Response" 420) is received, the response is recorded in the gateway (depicted by process "Record Ethernet Address for IP address" 422). The querying of each IP address may be done in two steps, by first determining if there is at least one IP device needing its IP address determined 410, then by determining if each IP address of the subset has been queried 412. If there are no more IP addresses in the subset to check, but there are additional IP devices for which an IP address is unknown (not yet recorded as a result of checking the subset), the method provided in FIG. 4 further comprises expanding the subset to an expanded subset within the subnet (depicted by process "Expand subset" 414), and repeating the querying (depicted by process "Query by APR a new IP address in expanded subset" 416), checking for a response 420, recording 422, asking if any IP device needs its IP address determined 410, asking if each address of the expanded subset has been determined 412, and expanding 414, until all IP devices have IP addresses recorded, at which point the method is stopped (depicted by "Stop" 408).

In a user network which may be relatively small, a block, or subset, smaller than 50 may be used. For example, according to an embodiment, a block of approximately or less than 25 (for example in an embodiment approximately or less than $\frac{1}{10}$ of the typical overall address space may be used).

According to an embodiment, the range of addresses is chosen by picking the range of addresses centered or substantially centered on the gateway itself. So the range of addresses for a gateway at 192.168.0.102, with a range size of 25 addresses would be from 192.168.0.90 to 192.168.0.114, for example.

In some embodiments, if the gateway's address is at one end of the pool, it may not properly match the pool of addresses being given out by the router device. Typically, most routers use a pool of addresses that starts on a rounded value, for example: 10, 20, 25, 50, 75, 100, 120, 130, 140, 150, 160, 170, 175, 180, 200, any multiple of two, any multiple of three, and/or any multiple of five. Using this additional assumption, the bounds for the pool of address to inspect can be computed as:

lower bound=(gateway address)−((gateway address) modulo (pool size))

upper bound=(lower bound)+(pool size)

For a gateway at IP address 192.168.0.102, and a pool size of 25, this would be:

lower bound=(102)−(102 modulo 25)=102−2=100 upper bound=100+25=125

This method can help to search a subset that is more likely to match the pool of addresses assigned by the router.

Provided herein is a local management system comprising at least one IP device assigned an IP address by a router at the location and a gateway device at the location which has also been assigned an IP address by the router and is at the location. Any gateway device described herein may be used in the system, and may comprise logic that discovers the IP addresses of the IP devices by the methods described herein.

Provided herein is a gateway device at the location which has been assigned an IP address by a router. The gateway device comprises logic that discovers the IP addresses of IP devices with which the IP devices communicates at a local network at a location. The logic may use any of the methods described herein to discover the IP address of any IP device to which it connects by the methods described herein. The location may be a premises or any location described herein. In some embodiments, the logic comprises a computer.

In some embodiments, a network for premises management comprises any of the above systems or methods alone or in combination. The network may include premises management devices such as a smart thermostat. The premises management devices are coupled to a premises network which can be, for example, a radio frequency (RF) and/or power line network. The premises management devices may be coupled to a premises network by, for example, a interoperable wireless communication protocol, such as Z-Wave. The premises network is connected to a gateway which in turn is connected to a broadband device such as a digital subscriber line (DSL), cable line, Digital Signal 1 telecommunications line, or Transmission Level 1 (T1) telecommunications line. The gateway can alternatively or also be connected to a dial up modem. The premises is connected to the Internet according to an embodiment. The Internet is connected to system managers at the network operations center. The Internet is also connected to customers of the system manager, for example vendors such as premises vendors, communication service vendors, or Internet portal vendors. The Internet is also connected to vendees, such as premises vendees, communication service vendees, or Internet portal vendees.

An embodiment may include programmable code and devices with screens of a portal interface for premises management. For example, code with may summarize premises management services. Code may summarize security management services and safety management services. Code may also summarize energy management services.

Services offered by the system can be branded and incorporated into a third part web portal, for example, in a personal portal such as one provided by Yahoo.

The look and feel of the system pane can be tailored by the service provider.

In an embodiment, a system portal summary page may show a snap-shot of the state of the various devices in the user premises. For example, in an embodiment, the user can change premises by clicking on this box and selecting a different premises. A status pane may list the different devices in the user premises along with their actual states. A pending updates pane may show the time of the last communication between the premises and the server as well as any pending updates waiting to be sent downlink to the premises. The pictures pane shows the last several (e.g., last four) pictures taken by the camera in the user premises. The user can click on a thumbnail picture to look at a larger version of the photo as well as access archived images for that camera, look at live video, take new pictures or delete photos. The schedule pane shows the scheduled activities for the premises. The alarm history shows an archive of the most recent event and activity in the user premises. The reminders pane provides a means for the system to remind the user to perform certain activities or functions related to their home or business. The mode drop down button on the blue navigation bar allows the user to switch between the systems modes. The QuikControl drop down allows the user to control any device that is controllable (e.g., camera, thermostat, lamps, etc.).

According to an embodiment, a method is provided for premises management networking. Premises management devices connected to a gateway at a premises are monitored and controlled. According to an embodiment, an uplink-initiation signal associated with a network operations center server is received at the premises. In response to the uplink-initiation signal, communications between the gateway and the network operations center server may be initiated from the gateway at the premises.

During the communications between the gateway and the network operations center server, information associated with the premises management devices may be communicated.

The premises gateway may be a low-cost and standalone unit that connects the in-premises devices to the server. The connectivity to the Internet can be accomplished via a broadband connection (T1, DSL or cable) and/or via a telephone line. Though broadband connectivity may be used, telephone connectivity may be present as a back-up option in case the broadband connection is lost. For premises without a broadband connection (e.g., vacation homes) a telephone-only connection can be used.

A user account may be established by the end user using personal information (name, payment option, etc.) of the user. The account registration may involve the user logging on to the system manager web site and establishing a new account by entering name, address, phone number, payment details and/or the gateway serial number printed on the gateway in the end user's possession. In some cases the system manager service account may already be pre-established with the gateway serial number and the end user simply has to update the account with personal and payment information. Multiple gateways can also be handled per user account.

The gateway may be registered to associate the user account on the system manager server (established in the previous step) with an actual gateway in the user's home. The gateway is connected to a broadband network or a telephone line in the home.

An embodiment may help provide users with a hosted and managed service for premises device monitoring and control for a fee, such as a monthly subscription fee. The premises markets include residential homes, commercial multiple tenant units (MTUs) as well as small businesses.

Embodiments may provide device logging, activity logging and tracking. For example, an embodiment can log any device variable specified by the user for up to, for example, 30 days. The user defines a logging interval for each variable at the time of configuration. The logging feature can be handled by the gateway on the local device side and the data may be transferred to the server at regular intervals. The overall variable log for all variables can be kept on the server side. Logging of data for more than, for example, 30 days (but no more than, for example, 180 days) may be provided to the user, for example for a nominal fee. An embodiment may provide at least, for example, a 14-day history log of all user, system and device actions. An action includes a change to a device variable, system or network settings brought on by either the system or the user (e.g., variable changed, logging enabled, device added, user notified, etc.). The user can trace back system activities to their cause and to the date and time they occurred. Past activities can be searched by variable, device, category or date.

An embodiment can support user-defined modes, such as "home," "away," "sleep," "vacation," etc. The mode the user network is in plays a factor in the determination of the actions taken (reporting, alarming, eventing, notification, etc.) by the system when variable changes occur. According to an embodiment, the user can specify alarm conditions for variables with discrete states (e.g., binary ON/OFF). These alarms can be reported in real-time (i.e., immediate uplink) by the gateway to the server. The server then in turn looks at the data and determines, based on user alarm settings, whether to notify the user or not.

According to an embodiment, for non-critical events, the system can notify the user in non-real-time fashion regarding the state of any variable specified by the user. The variables chosen for user eventing can be of any kind (discrete or continuous). The gateway updates the server with the change of variable state/value at a regularly scheduled upload. The server continuously looks at variable data and determines, based on user eventing settings, whether to notify the user or not. Eventing conditions can be determined based on the value or state of a variable as well as the system mode. According to an embodiment, the system can support user alarming and eventing via the following methods: email, text messaging, pager, and/or voice telephone call (voice synthesis).

An embodiment may provide device data monitoring and control. The user can specify any device variable for monitoring and control via the server portal. For example, up to 255 devices can be supported by a single gateway. For example, up to 512 variables can be supported by a single gateway.

The system can support an open architecture where most, if not all device networking protocols can be supported. Examples of specific device protocols supported by the system include RF and powerline protocols, such as GE Interlogix RF and Echelon LonWorks power line (PL & FT), simplifying the installation burden by requiring no new wires to be installed in a premises. The LonWorks free topology twisted pair medium (FT-10) can be supported as an option to support certain commercial applications (e.g., office buildings).

The following is a non-exhaustive list of a few other devices supported by the system.

1. Small data/message display—for text messages, news, weather, stock, photos, etc.
2. Door latch control
3. Pool/spa control
4. Weather station
5. Lighting control
6. Elderly or disabled monitoring
7. Irrigation controller (Bibija)
8. VCR programming The system can support cameras. For example, standard off-the-shelf IP cameras (also referred to as web cameras) may be used, such as those available from vendors such as Axis, Panasonic, Veo, D-Link, and Linksys, or other cameras manufactured for remote surveillance and monitoring. Surveillance cameras may contain a standalone web server and a unique IP address may be assigned to the camera. The user of such a camera would typically retrieve the camera image by accessing the camera's web page through a standard web browser, using the camera's IP address. In some cases the IP camera acquires a local IP address by using a DHCP client to negotiate an address from the local DHCP server (usually residing in the user's router/firewall).

According to an embodiment, a gateway can initiate all communications with the server. Gateway communication can either initiate based on a predetermined schedule (e.g., every 30 minutes) or due to a local premises alarm (selected by the user).

Gateways can contact a common server for their first uplink connection in order to obtain their assigned gateway server address, which they can use for all subsequent uplink connections (unless changed later by the system). In the event that the gateway cannot connect to its designated gateway server, it can fall back to contacting the default initial gateway in order to refresh its gateway server address.

The predetermined call initiation schedule can be programmable by the server and can provide different intervals for broadband and telephone intervals (e.g., every 30 minutes for broadband and every 90 minutes for telephone).

An embodiment may be directed to a control network having a collection of sensor and actuator devices that are networked together. Sensor devices sense something about their surroundings and report what they sense on the network. Examples of sensor devices are door/window sensors, motion detectors, smoke detectors and remote controls.

Actuator devices receive commands over the network and then perform some physical action. Actuator devices may include light dimmers, appliance controllers, burglar alarm sirens and cameras. Some actuator devices also act as sensors, in that after they respond to a command, the result of that command is sent back over the network. For example, a light dimmer may return the value that it was set to. A camera returns an image after it has been commanded to snap a picture.

In addition to the foregoing, the following are various examples of embodiments of the invention.

Some embodiments of a method for premises management networking include monitoring premises management devices connected to a gateway at a premises; controlling premises management devices connected to the gateway at the premises; receiving, at the premises, an uplink-initiation signal associated with a network operations center server; and in response to the uplink-initiation signal, initiating, from the gateway at the premises, communications between the gateway and the network operations center server; and communicating, during the communications between the gateway and the network operations center server, information associated with the premises management devices.

The uplink-initiation signal can be received via telephone and/or broadband connection. The gateway can initiate communications between the gateway and the network operations center server with at least an HTTP message and/or at least an XML message. The premises management devices can manage energy of the premises, security of the premises, and/or safety of the premises. Many embodiments provide a hosted solution for property developers, owners and managers as well as service providers (Internet Service Providers(ISPs), telcos, utilities, etc.) such as communication service providers and Internet portal providers. Some embodiments offer a complete, turnkey, reliable, and/or cost-effective solution for the delivery of telemetry services (e.g., energy management, security, safety, access, health monitoring, messaging, etc.) to customers.

An embodiment of the invention is directed to a business method for premises management. Some embodiments of a business method for premises management include making an Internet portal available for access to a vendee, such as a premises vendee, communication service vendee, and/or an Internet portal vendee; and at least after a transaction between the vendor and the vendee, such as a premises transaction, a communication services transaction, and/or Internet portal services transaction, providing premises management services via the Internet portal to the vendee.

The Internet portal can be branded with a brand of the vendor according to an embodiment. Examples of a premises vendor include a home builder, premises builder, and premises manager. Examples of a premises vendee include a home buyer, premises buyer, and premises tenant. Examples of a communication service vendor include an Internet service provider, a telephone company, a satellite television company, and a cable television company. Examples of a communication service vendee include a customer of the Internet service provider, a customer of the telephone company, a customer of the satellite television company, and a customer of the cable television company. Premises management services can manage energy of the premises, security of the premises, and/or safety of the premises.

An embodiment of the invention is directed to a system. The system includes a network of premises management devices, a gateway coupled to the network and premises management devices, a server coupled to the gateway by a communication medium and a portal coupled to the communications medium. The portal provides communication with the premises management devices.

According to various embodiments in the invention alone or in various combinations: the communications medium may comprise the Internet; the portal may comprise an Internet portal; and/or the portal may be branded with the name of a vendor of a product associated with the premises. The product may comprise a building, and/or the vendor may comprise a party that leases the premises. The vendor may also or alternatively comprise a property management organization. The server may be included within a network operations center. The logic may comprise, according to various embodiments of the invention, software, hardware, or a combination of software and hardware.

Another embodiment to the invention is directed to a gateway. The gateway includes an interface coupled to a network of premises management devices, logic that receives data from different premises management devices, and an interface coupled to a communications medium that is coupled to a server. The server is coupled to a portal coupled to the communications medium. The portal provides communications with the premises management devices.

According to various embodiments of the invention alone or in various combinations: the communications medium may comprise the Internet; the portal may comprise an Internet portal; and/or the portal may be branded with the name of a vendor of a product associated with the premises. The product may comprise a building; the vendor may comprise a party that leases the premises; the vendor may comprise a property management organization; and/or the server may be included within a network operations center.

Provided herein is a method for Internet Protocol (IP) device discovery implemented in a control network having a gateway device, a router, and an IP device, wherein the gateway device, the router, and the IP device are at a location. In some embodiments, the method comprises receiving, in the gateway device, a gateway IP address assigned to the gateway device by the router from a pool of IP addresses smaller than a subnet of possible network IP addresses, wherein the gateway device is coupled to the network. In some embodiments, the method comprises determining an IP address for the IP device at the location, the IP device coupled to the gateway, wherein the router has assigned the IP address to the IP device at the location from the pool. The determining may include the gateway device choosing a subset of IP addresses from the subnet, wherein the subset comprises a continuous subset range, wherein the continuous subset range includes the gateway IP address, wherein the subset has a size is substantially smaller than a size of the subnet, and wherein the subset contains at least as many IP addresses as the total number of IP devices coupled to the gateway device. The determining may include the gateway device querying IP addresses within the subset to determine the IP address of the IP device at the location. In some embodiments, the method for Internet Protocol (IP) device discovery comprises the gateway device communicating with the IP device at the location using the determined IP address of the IP device. In some embodiments, the method comprises managing the IP device at the location.

In some embodiments, the step of determining includes querying respective addresses in the chosen subset of IP addresses, and if the querying of the IP addresses in the subset results in a response, wherein the response comprises an Ethernet address of the IP device and the IP address of the IP device, recording the response in the gateway device.

In some embodiments of the method, if querying of the IP address within the subset results in no response, the step of determining further comprises the gateway device repeating the querying at different IP addresses within the subset until either a response is received, or there all IP addresses of the subset have been queried, and if the entire subset has been queried, and there is an IP device without an IP address determined, the gateway device expanding the subset to an expanded subset within the subnet and the gateway device querying at IP addresses within the expanded subset until either a response is received, or there all IP addresses of the expanded subset have been queried. In some embodiments of the method, the method further comprises the gateway device communicating with the IP device at the location using the determined IP address of the IP device, and the method comprises managing the IP device at the location.

In some embodiments, the expanded subset of IP addresses is greater in number than the subset, and the expanded subset range includes the subset range. In some embodiments, the step of determining includes querying respective addresses in the chosen expanded subset of IP addresses, and if the querying of the IP addresses in the expanded subset results in a response, wherein the response comprises an Ethernet address of the IP device and the IP address of the IP device, the determining step comprises recording the response in the gateway device.

In some embodiments, the querying of the expanded subset comprises using an Address Resolution Protocol. In some embodiments, the subset range is substantially centered at the gateway IP address. The subset range may begin at a multiple of a selected number which is at the gateway IP address or is less than the selected number of sequential addresses from the gateway IP address. The selected number may be, for non-limiting example, 5, 2, 3, 10, or 25.

In some embodiments, the subset range begins at a multiple of 25 which is at the gateway IP address or is less than 25 sequential addresses from the gateway IP address.

In some embodiments, the subset range begins at a multiple of 50 which is at the gateway IP address or is less than 50 sequential addresses from the gateway IP address. In some embodiments, the subset range begins at a multiple of 100 which is at the gateway IP address or is less than 100 sequential addresses from the gateway IP address. In some embodiments, the subset range begins at a multiple of 150 which is at the gateway IP address or is less than 150 sequential addresses from the gateway IP address.

In some embodiments, the querying of the subset comprises using an Address Resolution Protocol. In some embodiments, the subset comprises at least one of: 10 sequential IP addresses in the range, 25 sequential EP addresses in the range, 50 sequential IP addresses in the range, 100 sequential IP addresses in the range, 150 sequential IP addresses in the range, 200 sequential IP addresses in the range, and between 10 and 200 sequential IP addresses in the range. In some embodiments, the subset size comprises at least one of: at most about $1/10$ of the subnet size, at most about $1/8$ of the subnet size, at most about $1/6$ of the subnet size, at most about $1/4$ of the subnet size, at most about $1/3$ of the subnet size, at most about $1/2$ of the subnet size, and at most about $3/5$ of the subnet size. In some embodiments, the subset comprises at least one of: at most about 25% of the number of IP addresses in the router pool, at most about 50% of the number of IP addresses in the router pool, at most about 75% of the number of IP addresses in the router pool, at most about 100% of the number of IP addresses in the router pool, at most about 125% of the number of IP addresses in the router pool, at most about 150% of the number of IP addresses in the router pool, at most about 200% of the number of IP addresses in the router pool, at most about 250% of the number of IP addresses in the router pool, and at most about 300% of the number of IP addresses in the router pool. The term "about" when referring to subnet size, pool size, subset size, or IP addresses, refers to variations of 1 to 3 addresses, or 2 to 5 addresses.

Provided herein is a location management system. In some embodiments, the location management system comprises at least one IP device at a location assigned an IP address by a router at the location. The location management system may comprise a gateway device at the location. The gateway device may comprise an interface that allows connectivity to a network over which the gateway can communicate to remote systems which are remote to the location. The gateway device may comprise an interface for communication with the IP device. The gateway device may comprise logic that receives a gateway IP address assigned to the gateway device by the router from a pool of IP addresses smaller than a subnet of possible network IP addresses available to the router to assign addresses, wherein the gateway is coupled to the network. The gateway device may comprise logic that determines the IP address for the IP device coupled to the gateway, wherein the router has assigned an IP address to the IP device coupled to the gateway from the pool. In some embodiments, the logic that determines the IP address for the IP device coupled to the gateway comprises logic that chooses a subset of EP addresses from the subnet, wherein the subset comprises a continuous subset range, wherein the continuous subset range includes the gateway IP address, and wherein the subset size has a size that is substantially smaller than a size of the subnet, and wherein the subset contains at least as many IP addresses as the total number of IP devices coupled to the gateway. In some embodiments, the logic that determines the IP address for the IP device coupled to the gateway comprises logic that queries IP addresses within the subset to determine the IP address of the IP device at the location. In some embodiments, the gateway device comprises logic that communicates with and manages the IP device using the IP address of the IP device.

In some embodiments, managing the IP device includes monitoring the IP device coupled to the gateway device at the location. Managing the IP device may include controlling the IP device coupled to the gateway device at the location. The location management system may include a non-IP device coupled to the gateway. In some embodiments, the location management system includes a Z-wave device coupled to the gateway. The location management system may include a radio frequency (RF) device coupled to the gateway.

In some embodiments, the gateway device comprises logic that queries whether an IP address within the subset has been assigned. If the querying of the IP address in the subset results in a response, wherein the response comprises an Ethernet address of the IP device and the IP address of the IP device, the gateway device may comprise logic that records the response in the gateway device. In some embodiments, the logic comprises computer program code stored in a memory on the gateway. In some embodiments, the logic comprises computer electronic circuitry included in the gateway.

In some embodiments, the logic comprises electronic circuitry and computer program code in the gateway.

Provided herein is a gateway device at for managing a set of local management devices at a location. In some embodiments, the gateway device comprises logic for monitoring and controlling a set of local management devices coupled to a local network located at the location, wherein the gateway is also located at the location, and wherein the set of local management devices comprises at least one IP device. In some embodiments, the gateway device comprises an interface that allows connectivity to a network over which the gateway can communicate to remote systems which are remote to the location, an interface for communication to the IP device, a processor, and memory.

In some embodiments, the gateway device further comprises logic that receives a gateway IP address assigned to the gateway device by the router from a pool of IP addresses smaller than a subnet of possible network IP addresses available to the router to assign addresses, wherein the gateway is coupled to the network. In some embodiments, the gateway device comprises logic that determines the IP address for the IP device coupled to the gateway, wherein the router has assigned an IP address to the IP device coupled to the gateway from the pool.

In some embodiments, the logic that determines the IP address for the IP device coupled to the gateway comprises logic that chooses a subset of IP addresses from the subnet, wherein the subset comprises a continuous subset range, wherein the continuous subset range includes the gateway IP address, and wherein the subset has a size that is substantially smaller than a size of the subnet, and wherein the subset size contains at least as many IP addresses as the total number of IP devices coupled to the gateway. In some embodiments, the logic that determines the IP address for the IP device coupled to the gateway comprises logic that queries whether an IP address within the subset has been assigned. In some embodiments, if the querying of the IP address in the subset results in a response, wherein the response comprises an Ethernet address of the IP device and the IP address of the IP device, the logic that determines the IP address for the IP device coupled to the gateway comprises logic that records the response in the gateway device.

In some embodiments, the gateway device further comprises logic that allows communication with the IP device using the recorded IP address for the IP device. The gateway device may further comprise logic that allows management of the IP device at the location. The management may comprise monitoring the IP device coupled to the gateway at the location. The management may comprise controlling the IP device coupled to the gateway at the location. In some embodiments, the logic comprises a computer. In some embodiments, the logic comprises computer program code stored in a memory on the gateway device. In some embodiments, the logic comprises electronic circuitry included in the gateway device. In some embodiments, logic comprises electronic circuitry and computer program code in the gateway device.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include: microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neural network) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, email, etc.) over the Internet and/or other computer networks via one or more data transfer protocols (e.g., hypertext transfer protocol (HTTP), file transfer protocol (FTP), simple mail transfer protocol (SMTP), etc.). When received within a computer system via one or more computer-readable media, such data and/or instruction-based expressions of components and/or processes under the systems and methods may be processed by a processing entity (e.g., one or more processors) within the computer system in conjunction with execution of one or more other computer programs.

Unless the context clearly requires otherwise, throughout the description and the claims, the words 'comprise,' 'comprising,' and the like are to be construed in an inclusive sense as opposed to an exclusive or exhaustive sense; that is to say, in a sense of 'including, but not limited to.' Words using the singular or plural number also include the plural or singular number respectively. Additionally, the words 'herein,' 'hereunder,' 'above,' 'below,' and words of similar import refer to this application as a whole and not to any particular portions of this application. When the word 'or' is used in reference to a list of two or more items, that word covers all of the following interpretations of the word: any of the items in the list, all of the items in the list and any combination of the items in the list.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, the terms used should not be construed to limit the systems and methods to the specific embodiments disclosed in the specification and the claims, but should be construed to include all processing systems that operate under the claims. Accordingly, the systems and methods are not limited by the disclosure.

While certain aspects of the systems and methods may be presented in certain claim forms, the inventors contemplate the various aspects of the systems and methods in any number of claim forms. Accordingly, the inventors reserve the right to add additional claims after filing the application to pursue such additional claim forms for other aspects of the systems and methods.

What is claimed is:

1. A method for Internet Protocol (IP) device discovery implemented in a control network having a gateway device, a router, and an IP device, wherein the gateway device, the router, and the IP device are at a same location, wherein the method comprises:

receiving, in the gateway device, a gateway IP address assigned to the gateway device by the router from a pool of IP addresses smaller than a subnet of possible network IP addresses, wherein the gateway device is coupled to the network;

determining an IP address for the IP device at the location, the IP device coupled to the gateway, wherein the router has assigned the IP address to the IP device at the location from the pool, the determining including:

the gateway device choosing a subset of IP addresses from the subnet, wherein the subset comprises a continuous subset range, wherein the choosing the subset includes determining at least one boundary of the continuous subset range using the gateway IP address, wherein the continuous subset range includes the gateway IP address, and wherein the subset has a size that is smaller than a size of the subnet, and wherein the subset contains at least as many IP addresses as the total number of IP devices coupled to the gateway device, and the gateway device querying IP addresses within the subset to determine the IP address of the IP device at the location; and the gateway device communicating with the IP device at the location using the determined IP address of the IP device; and managing the IP device at the location.

2. The method of claim 1, wherein the determining includes:

querying respective addresses in the chosen subset of IP addresses; and if the querying of the IP addresses in the subset results in a response, wherein the response comprises an Ethernet address of the IP device and the IP address of the IP device, recording the response in the gateway device.

3. The method of claim 1, wherein if querying of the IP address within the subset results in no response, the determining comprises:

the gateway device repeating the querying at different IP addresses within the subset until either a response is received or all IP addresses of the subset have been queried; and if the entire subset has been queried, and there is an IP device without an IP address determined, the gateway device expanding the subset to an expanded subset within the subnet and the gateway device querying at IP addresses within the expanded subset until either a response is received, or there all IP addresses of the expanded subset have been queried;

and the method further comprises:

the gateway device communicating with the IP device at the location using the determined IP address of the IP device; and managing the IP device at the location.

4. The method of claim 3, wherein the expanded subset of IP addresses is greater in number than the subset, and wherein the expanded subset range includes the subset range.

5. The method of claim 3, wherein the determining includes:

querying respective addresses in the chosen expanded subset of IP addresses; and if the querying of the IP addresses in the expanded subset results in a response, wherein the response comprises an Ethernet address of the IP device and the IP address of the IP device, recording the response in the gateway device.

6. The method of claim 1, wherein querying comprises using an Address Resolution Protocol.

7. The method of claim 1, wherein the subset range is centered at the gateway IP address.

8. The method of claim 1, wherein the subset range begins at a multiple of a selected number which is at the gateway IP address or is less than the selected number of sequential addresses from the gateway IP address.

9. The method of claim 1, wherein the selected number is the gateway address rounded to the nearest 5.

10. The method of claim 1, wherein the selected number is the gateway address rounded to the nearest 2.

11. The method of claim 1, wherein the selected number is the gateway address rounded to the nearest 10.

12. The method of claim 1, wherein the subset range begins at a multiple of 25 which is at the gateway IP address or is less than 25 sequential addresses from the gateway IP address.

13. The method of claim 1, wherein the subset range begins at a multiple of 50 which is at the gateway IP address or is less than 50 sequential addresses from the gateway IP address.

14. The method of claim 1, wherein the subset range begins at a multiple of 100 which is at the gateway IP address or is less than 100 sequential addresses from the gateway IP address.

15. The method of claim 1, wherein the subset range begins at a multiple of 150 which is at the gateway IP address or is less than 150 sequential addresses from the gateway IP address.

16. The method of claim 1, wherein the subset comprises at least one of: 10 sequential IP addresses in the range, 25 sequential IP addresses in the range, 50 sequential IP addresses in the range, 100 sequential IP addresses in the range, 150 sequential IP addresses in the range, 200 sequential IP addresses in the range, and between 10 and 200 sequential IP addresses in the range.

17. The method of claim 1, wherein the subset size comprises at least one of at most about $1/10$ of the subnet size, at most about $1/3$ of the subnet size, at most about $1/16$ of the subnet size, at most about $1/4$ of the subnet size, at most about $1/3$ of the subnet size, at most about $1/2$ of the subnet size, and at most about $3/5$ of the subnet size.

18. The method of claim 1, wherein the subset comprises at least one of at most about 25% of the number of IP addresses in the router pool, at most about 50% of the number of IP addresses in the router pool, at most about 75% of the number of IP addresses in the router pool, at most about 100% of the number of IP addresses in the router pool, at most about 125% of the number of IP addresses in the router pool, at most about 150% of the number of IP addresses in the router pool, at most about 200% of the number of IP addresses in the router pool, at most about 250% of the number of IP addresses in the router pool, and at most about 300% of the number of IP addresses in the router pool.

19. A location management system comprising:

at least one IP device at a location assigned an IP address by a router at the same location; and a gateway device at the same location comprising:

an interface that allows connectivity to a network over which the gateway can communicate to remote systems which are remote to the location, an interface for communication with the IP device, logic that receives a gateway IP address assigned to the gateway device by the router from a pool of IP addresses smaller than a subnet of possible network IP addresses available to the router to assign addresses, wherein the gateway is coupled to the network;

logic that determines the IP address for the IP device coupled to the gateway, wherein the router has assigned an IP address to the IP device coupled to the gateway from the pool, comprising:

logic that chooses a subset of IP addresses from the subnet, wherein the subset comprises a continuous subset range, wherein the choosing the subset includes determining at least one boundary of the continuous subset range using the gateway IP address, wherein the continuous subset range includes the gateway IP address, and wherein the subset has a size that is smaller than a size of the subnet, and wherein the subset contains at least as many IP addresses as the total number of IP devices coupled to the gateway; and logic that queries IP addresses within the subset to determine the IP address of the IP device at the location; and logic that communicates with and manages the IP device using the IP address of the IP device.

20. The gateway device of claim 19, wherein managing the IP device includes monitoring the IP device coupled to the gateway device at the location.

21. The gateway device of claim 19, wherein managing the IP device includes controlling the IP device coupled to the gateway device at the location.

22. The gateway device of claim 19, wherein the location management system includes a non-IP device coupled to the gateway.

23. The gateway device of claim 19, wherein the location management system includes a Z-wave device coupled to the gateway.

24. The gateway device of claim 19, wherein the location management system includes a radio frequency device coupled to the gateway.

25. The gateway device of claim 19 comprising:

logic that queries whether an IP address within the subset has been assigned; and if the querying of the IP address in the subset results in a response, wherein the response comprises an Ethernet address of the IP device and the IP address of the IP device, logic that records the response in the gateway device.

26. The gateway device of claim 19, wherein the logic comprises computer program code stored in a memory on the gateway.

27. The gateway device of claim 19, wherein the logic comprises computer electronic circuitry included in the gateway.

28. The gateway device of claim 19, wherein the logic comprises electronic circuitry and computer program code in the gateway.

29. A gateway device for managing a set of local management devices at a same location, wherein the gateway device comprises:

a processor;

an interface coupled to the processor, wherein the interface couples to remote systems that are remote to the location via a network, wherein the interface couples to at least one IP device;

a memory coupled to the processor, wherein the memory includes logic executed by the processor that comprises, logic for monitoring and controlling a set of local management devices coupled to a local network located at the same location, wherein the set of local management devices comprises the at least one IP device;

logic that receives a gateway IP address assigned to the gateway device by the router from a pool of IP addresses smaller than a subnet of possible network IP addresses available to the router to assign addresses;

logic that determines the IP address for the at least one IP device, wherein the router has assigned an IP address to the at least one IP device from the pool, the logic comprising:

logic that chooses a subset of IP addresses from the subnet, wherein the subset comprises a continuous subset range, wherein the choosing the subset includes determining at least one boundary of the continuous subset range using the gateway IP address, wherein the continuous subset range includes the gateway IP address, and wherein the subset has a size that is smaller than a size of the subnet, and wherein the subset size contains at least as many IP addresses as the total number of IP devices coupled to the gateway device, logic that queries whether an IP address within the subset has been assigned, and if the querying of the IP address in the subset results in a response, wherein the response comprises an Ethernet address of the at least one IP device and the IP address of the at least one IP device, logic that records the response in the gateway device;

logic that allows communication with the at least one IP device using the recorded IP address for the at least one IP device; and logic that allows management of the at least one IP device at the location, wherein the management comprises at least one of monitoring the IP device coupled to the gateway device at the location, and controlling the at least one IP device coupled to the gateway device at the location.

* * * * *